United States Patent [19]

Dijkhuis et al.

[11] Patent Number: 5,089,242
[45] Date of Patent: Feb. 18, 1992

[54] METHOD FOR SELECTIVELY SEPARATING A NON-FERROUS METAL

[75] Inventors: Job Dijkhuis; Anthonie Van Sandwijk, both of Leiden, Netherlands

[73] Assignee: Hoogovens Groep BV, Ijmuiden, Netherlands

[21] Appl. No.: 608,705

[22] Filed: Nov. 5, 1990

[30] Foreign Application Priority Data

Nov. 10, 1989 [NL] Netherlands ............... 8902783

[51] Int. Cl.$^5$ ............... C01G 9/00; C01G 49/00
[52] U.S. Cl. ............... 423/109; 423/150; 75/961
[58] Field of Search ............... 423/109, 150; 75/961

[56] References Cited

U.S. PATENT DOCUMENTS 3,164,463 1/1965 Graham et al. ............... 75/962
4,018,680 4/1977 Kupfer ............... 75/961
4,614,543 9/1986 Duyvesteyn et al. ............... 423/109

OTHER PUBLICATIONS

Patent Abstracts of Japan, vol. 1, No. 120, 10/12/77, (JP 52-82616) H. Toda.
Patent Abstracts of Japan, vol. 1, No. 120, 10/12/77, (JP52-82617) H. Toda.
Patent Abstracts of Japan, vol. 2, No. 48, 5/31/78, (JP 53-4705) T. Kozaki.

Primary Examiner—Melvyn J. Andrews
Attorney, Agent, or Firm—Stevens, Davis, Miller & Mosher

[57] ABSTRACT

A method for selectively separating Zn from an acidic aqueous solution containing ions of Zn and Fe obtained by leaching of blast furnace dust using hydrochloric acid comprises first precipitating Fe from the solution and then treating the resultent Zn-containing solution with an alkali to precipitate Zn.

The Zn-containing solution is treated in two stages; in the first precipitation step the pH is adjusted to from 4.0 to 4.3.

4 Claims, 4 Drawing Sheets

METHOD FOR SELECTIVELY SEPARATING A NON-FERROUS METAL

BACKGROUND OF THE INVENTION

1. Field of the Invention

The invention relates to a method for selectively removing Zn from an aqueous solution, for example a filtrate originating from a pressure leaching process for leaching Zn and/or Pb out of a powdered material, such as blast furnace dust, containing iron.

2. Description of the Prior Art

A leaching process useful in the present method is known for example from EP-A-244910. That application describes how blast furnace dust is first separated by means of hydrocycloning into a low content Zn and Pb fraction which is suitable to be re-used in the blast furnace process, and a high content Zn and Pb fraction which undergoes further treatment.

More specifically, EP-A-244910 describes a process in which an aqueous slurry of blast furnace dust, comprising Zn, Pb and Fe is subjected to mechanical agitation, under an $O_2$ atmosphere under pressure and at elevated temperature. A HCl-containing reagent such as waste pickling liquor ($FeCl_2$/HCl) is added and the pH adjusted to from 2.6 to 3. The mixture is then filtered while hot to remove a solid material containing Fe and leaving a filtrate rich in Zn and Pb. On cooling, $PbCl_2$ crystallises out of the filtrate whilst the Zn-containing compounds remain in solution.

The above document suggests that the zinc is recovered from the remaining solution by treatment with sodium hydroxide, although no conditions of pH or temperature are recommended. The zinc content in such a precipitate may be up to approximately 30 wt %. However, the relatively Zn-rich fraction obtained in this way is not suitable for use as raw material for the zinc industry because high concentrations of Cl ions are present in the deposit. In this case, high concentrations of Cl are considered to be percentage weights of over 1%.

A further drawback with the aforementioned process is that the Zn content of the deposit obtained in this way is still relatively low for re-use in the Zn industry. For optimum processing quality of the solid matter obtained, it is desirable for the Zn content to be approximately 70%.

Zn may also be selectively removed from blast furnace dust by a leaching process which employs $H_2SO_4$. JP Kokai No 53-4705 describes a process in which $H_2SO_4$, $H_2O_2$ and slaked lime are used to separately recover Zn and Fe. $Fe(OH)_3$ is precipitated at pH5 and $Zn(OH)_2$ at pH 7-8. JP Kokai No 52-82616 relates to a process for separating Fe, Zn, Pb and C in secondary blast furnace dust by treatment with $H_2SO_4$. In the final stage $Zn(OH)_2$ is recovered by the addition of slaked lime at pH 6.5 to 9.

The problems associated with high chloride ion concentration in the final Zn precipitate clearly do not apply to these processes which employ $H_2SO_4$ as a leaching agent.

However, as HCl-containing reagents, such as pickling liquor, are more readily available, the present invention seeks to provide a process for selectively removing Zn from a filtrate originating from leaching using HCl-containing reagent, while giving Zn deposits having lower concentrations of Cl ions, compared to processes currently available.

3. Summary of the Invention

According to the invention there is provided a method for selectively separating Zn from an aqueous solution containing ions of Zn and Fe which method comprises
  (i) providing a solution containing ions of Zn and Fe obtained by leaching of blast furnace dust using hydrochloric acid,
  (ii) adjusting the pH of the solution to from 4.0 to 4.3 to precipitate Fe and removing the precipitate,
  (iii) adjusting the pH of the resultant solution with alkali to precipitate Zn.

Therefore, in conjunction with EP-A-244910, the present invention gives a method by which dust originating from blast furnaces may be fully processed into two main flows of re-useable solid raw materials, one for the blast furnace process itself, the other for the zinc and lead production industries.

A particular advantage of the method in accordance with the invention is that the liquid remaining following the second precipitation stage can largely meet environmental control requirements directed at waste flows discharged directly into the sea.

The present process is particularly suitable for treating liquids containing at least 10,000 ppm of chloride ions, obtained by leaching blast furnace dust using HCl.

The method in accordance with the invention also has the advantage that in the first stage of the Zn precipitation, undesirable elements such as Si, Al and Fe are largely deposited out of the solution, and may, therefore, be removed. In the subsequent second stage of the precipitation, highly effective precipitation of essentially zinc may then take place. Furthermore, most of the Pb is removed from the solution in the second stage. The present inventors have discovered that efficient control of pH during the first stage of this precipitation is critical, as may be seen from FIGS. 1 and 2 of the accompanying drawings. If the pH is too low, that is just below 4, then too little of the undesirable elements will be deposited. If on the other hand the pH is too high, that is just above 4.3, then besides the said undesirable elements precipitating, too much zinc will precipitate and moreover the precipitate will not be easy to filter. The pH may be adjusted by addition of an alkali, such as an alkali metal hydroxide or an alkaline earth metal hydroxide, for example.

Control of the pH during the second stage of the precipitation is not so critical. However, the pH may preferably be adjusted to a value of between 8 and 9.2 to obtain a precipitate having a reduced Cl ion concentration.

It is also desirable that precipitation in the first stage is carried out at a temperature of at least approximately 60° C. Under these conditions, the filtering quality of the slurry and the settling speed of the resultant precipitate are improved. In addition the second precipitation stage is preferably carried out at a temperature of at least approximately 45° C. This results in an improved quality of precipitate in which there is less absorption of chlorine. This is thought to be due to the precipitate containing a reduced amount of zinc oxychloride in comparison to those obtained in the prior art. Naturally this improves the processing quality of the solid matter deposited as raw material for the zinc industry.

The effect of temperature and pH variation on the weight percent of chloride in the filter cake obtained in a one step precipitation process is indicated in FIGS. 3 and 4 of the accompanying drawings.

BRIEF INTRODUCTION OF THE DRAWINGS

The invention will now be illustrated by reference to the accompanying drawings, in which FIG. 1 illustrates the degree of Zn lost from a solution when a series of precipitation processes were conducted, each at different pH.

DESCRIPTION OF THE PREFERRED EMBODIMENTS

Examples

Figure 1:
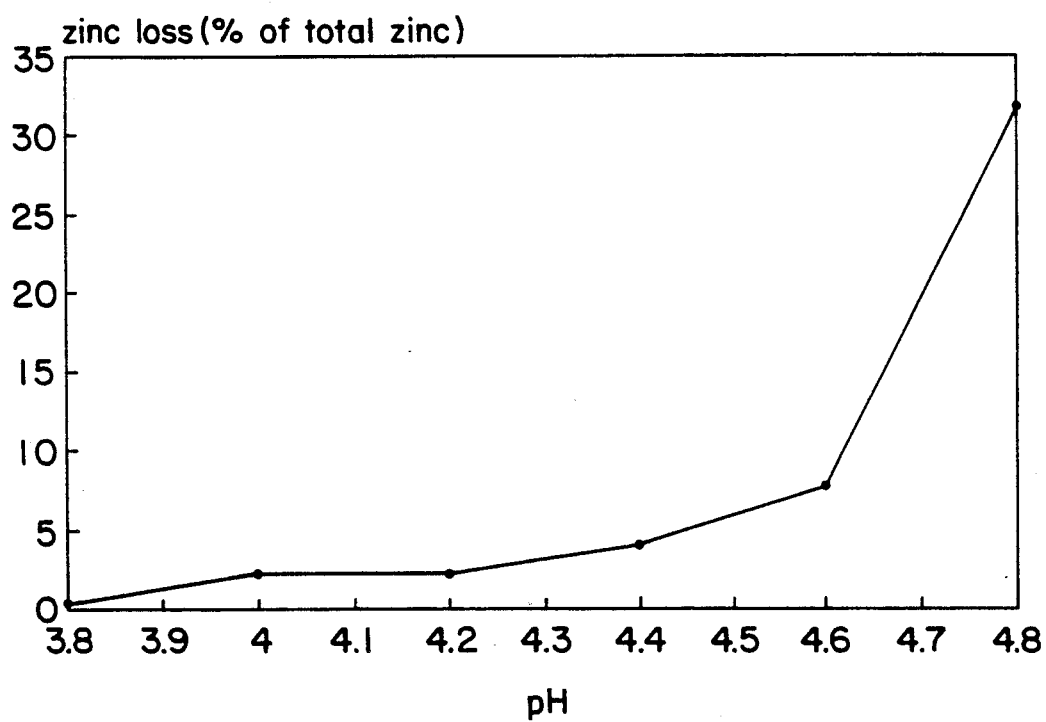

Liquid originating from an autoclave pressure leaching process conducted on blast furnace dust using waste pickling liquor, and with a composition as given in Table 1 was treated by the currently known technique as well as by techniques in accordance with the invention.

Comparative Example

Using the currently known technique precipitation from the composition of Table 1 was performed in one stage by addition of sodium hydroxide up to a maximum pH value of 9.2. The composition of the solid matter obtained was as stated in Table 2 at various pH values. The Zn content in the solid matter was approximately 30% and the Cl content was approximately 15%, which is too high for the precipitate to be suitable as a raw material for the zinc industry.

Illustrative Examples

The same base liquid as given in Table 1 was treated in accordance with the invention with a precipitation process in two stages at 95° C. with intermediate removal of the deposited precipitate following the first stage. The component fractions following the first and second precipitation stage are given in Table 3. The precipitate obtained following the second precipitation stage was very rich in Zn, exceeding 70 % wt., while the Cl percentage was well below 1%, which gives a very good processing quality, suitable as a raw material for the zinc industry.

Besides the zinc-rich solid matter, the liquid treated in accordance with the invention also leaves a residual liquid the composition of which is as given in Table 4. From an environmental point of view, all these compositions of residual liquids are sufficiently low for enabling these liquids to be discharged into the sea without prior further treatment.

TABLE 1

| Component parts of liquid to be treated (ppm) | | | | | | | | |
|---|---|---|---|---|---|---|---|---|
| Zn | Fe | Al | Mg | Ca | Mn | Si | Cl | Pb |
| 10900 | 998 | 1216 | 707 | 2825 | 267 | 236 | 25200 | 880 |

TABLE 2

| One-stage precipitation of zinc from the liquid of Table 1 | | | | | | | | | |
|---|---|---|---|---|---|---|---|---|---|
| pH | % Zn | % Fe | % Al | % Mg | % Ca | % Mn | % Si | % Cl | wt. (g) |
| 4.73 | 22.9 | 8.5 | 10.9 | 1.0 | 1.1 | 0.3 | 2.4 | 14.3 | 8.3 |
| 5.56 | 28.3 | 3.1 | 3.8 | 1.1 | 2.0 | 0.3 | 0.8 | 18.4 | 24.0 |
| 5.99 | 27.0 | 2.3 | 2.9 | 0.8 | 1.6 | 0.3 | 0.6 | 17.0 | 33.6 |
| 7.20 | 37.6 | 2.6 | 3.8 | 1.3 | 1.4 | 0.7 | 0.1 | 13.7 | 30.1 |
| 9.20 | 27.4 | 2.2 | 2.8 | 1.6 | 2.8 | 0.6 | 0.6 | 16.3 | 33.0 |

TABLE 3

| | Two-stage precipitation in accordance with the invention | | | | | | | | | |
|---|---|---|---|---|---|---|---|---|---|---|
| | pH | % Zn | % Fe | % Al | % Mg | % Ca | % Mn | % Si | % Pb | % Cl | wt. (g) |
| a | 4.28 | 11.1 | 21.39 | 22.98 | 0.08 | 0.61 | 0.01 | 4.13 | 0.12 | 4.14 | 4.8 |
|   | 9.08 | 74.0 | 0.04 | 0.04 | 4.55 | 0.53 | 1.65 | 0.52 | 0.07 | 0.35 | 13.6 |
| b | 4.24 | 8.7 | 22.32 | 24.56 | 0.02 | 0.21 | 0.01 | 4.43 | 0.86 | 4.77 | 4.5 |
|   | 9.10 | 73.0 | 0.02 | 0.08 | 4.32 | 0.53 | 1.54 | 0.51 | 4.01 | 0.11 | 14.6 |
| c | 4.18 | 7.0 | 21.00 | 22.30 | 0.03 | 0.37 | 0.03 | 3.93 | 0.78 | 6.4 | 6.1 |
|   | 8.98 | 70.5 | 0.01 | 0.02 | 4.25 | 0.12 | 1.67 | 0.48 | 4.05 | 0.5 | 13.1 |

TABLE 4

| | Waste water composition following two-stage precipitation (ppm) | | | | | | | | | |
|---|---|---|---|---|---|---|---|---|---|---|
| no | Zn | Fe | Al | Mg | Ca | Mn | Si | Pb | Cl | vol. (ml) |
| a | 6500 | 0.005 | 0.30 | 320 | 1890 | 120 | 32 | 3 | 15650 | 1490 |
|   | 11 | 0.001 | 0.20 | 2.6 | 1020 | 0.00 | 0.01 | 0.3 | 10500 | 2120 |
| b | 7760 | 0.005 | 0.30 | 395 | 2240 | 146 | 34 | 426 | 15600 | 1485 |
|   | 12 | 0.001 | 0.10 | 1.4 | 1223 | 0.00 | 0.01 | 4.9 | 11190 | 1920 |
| c | 9010 | 0.005 | 0.30 | 519 | 2860 | 189 | 40 | 523 | 16540 | 1500 |
|   | 13 | 0.001 | 0.10 | 13.2 | 1497 | 0.00 | 0.01 | 0.8 | 12372 | 2000 |

Various additional tests were conducted using the liquid described in Table 1. The results are illustrated in FIGS. 1 to 4.

Figure 2:
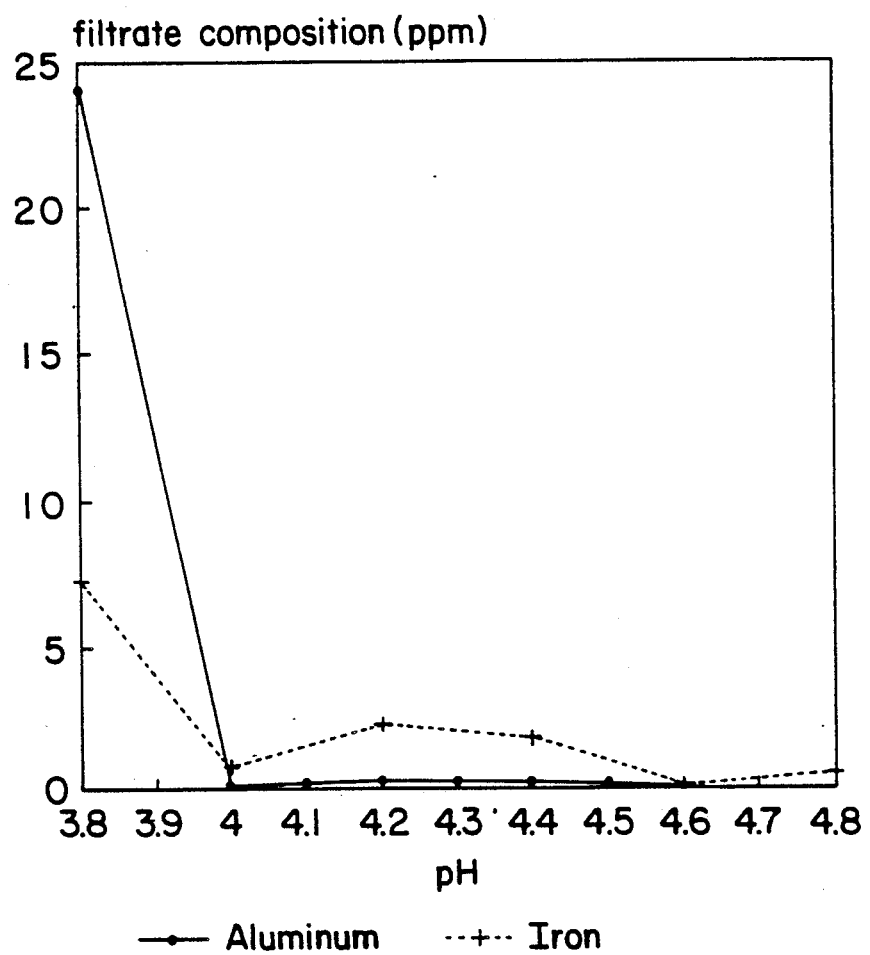
FIG. 2 illustrates the amount of Fe and Al remaining in solution after the firs precipitation step for a series of experiments each at different pH.
Figure 3:
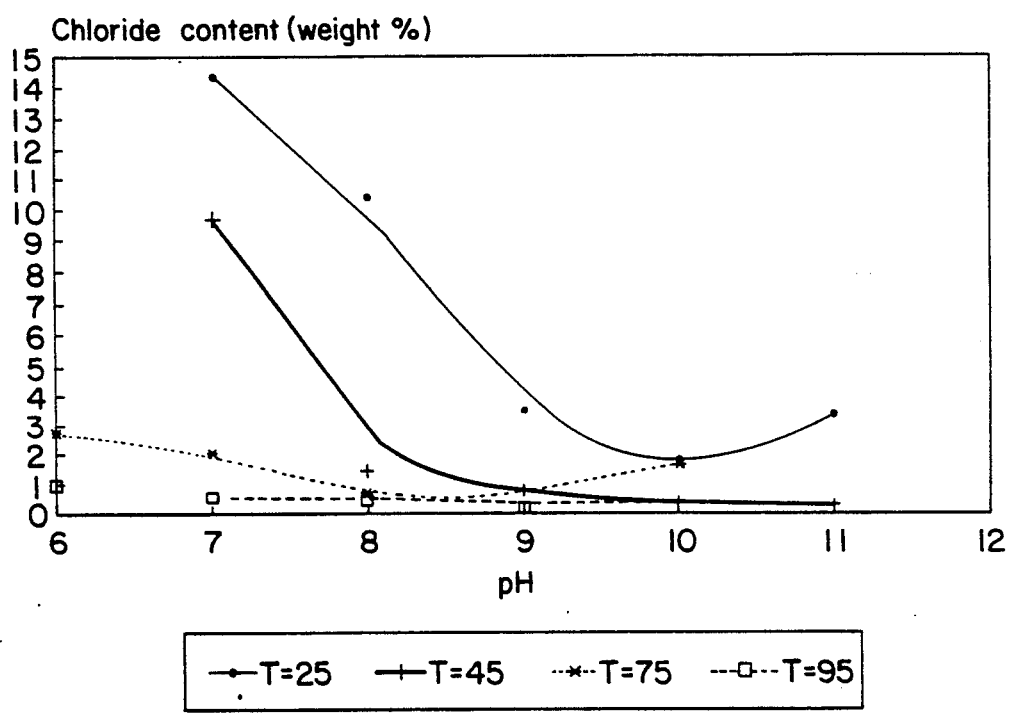
FIG. 3 illustrates the degree of chloride ions contained in a filter cake when a series of precipitation processes were conducted each under different conditions of pH and temperature.
Figure 4:
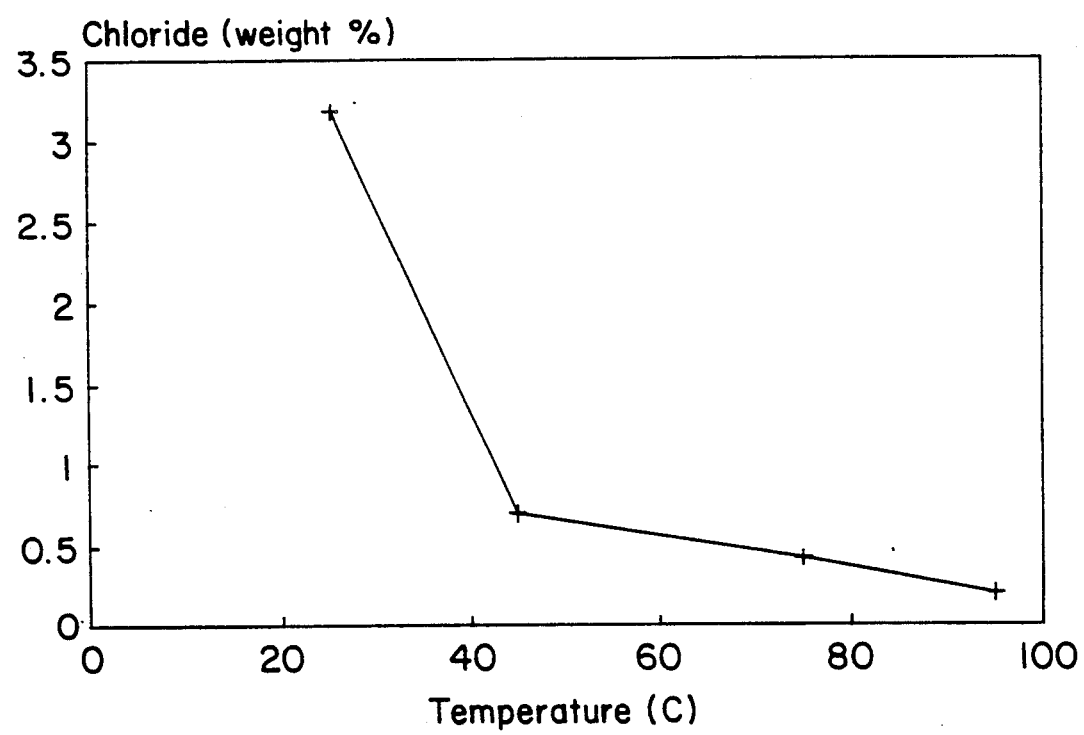
FIG. 4 illustrates the degree of chloride ions contained in the filter cake for a series of precipitation processes conducted over a range of temperatures.

As may be seen from FIG. 1, the amount of Zn lost in the first precipitation stage is unsatisfactory when the pH is above 4.3, and particularly poor above pH 4.6. In addition, FIG. 2 shows that at below pH 4.0, the amount of Fe and Al removed by the first precipitation is unsatisfactory. Improved results were obtained at pH 4 and above.

What is claimed is:

1. A method for selectively separating Zn from an aqueous solution containing ions of Zn and Fe which method comprises
   (i) providing a solution containing ions of Zn and Fe obtained by leaching of blast furnace dust using hydrochloric acid, (ii) adjusting the pH of the solution to from 4.0 to 4.3 to precipitate Fe and removing the precipitate, (iii) adjusting the pH of the resultant solution with alkali at a temperature of at least 45° C. to precipitate Zn.

2. A method according to claim 1 in which the solution in (i) has been obtained by leaching blast furnace dust with waste pickling liquor from a hydrochloric pickling process.

3. A method according to claim 1 in which the first precipitation step is carried out at at least 60° C.

4. A method according to claim 1 in which the pH of the solution is adjusted to from 8 to 9.2 to precipitate Zn.

* * * * *